F. T. WILSON & E. J. BARTLETT.
HAY-LOADER.
No. 175,226. Patented March 21, 1876.
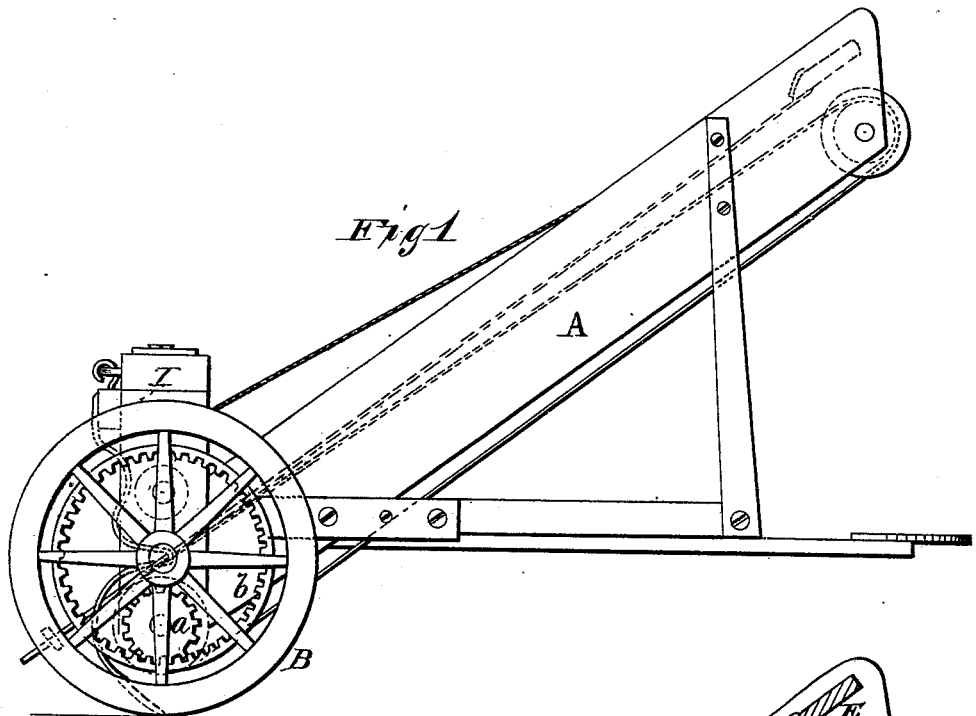
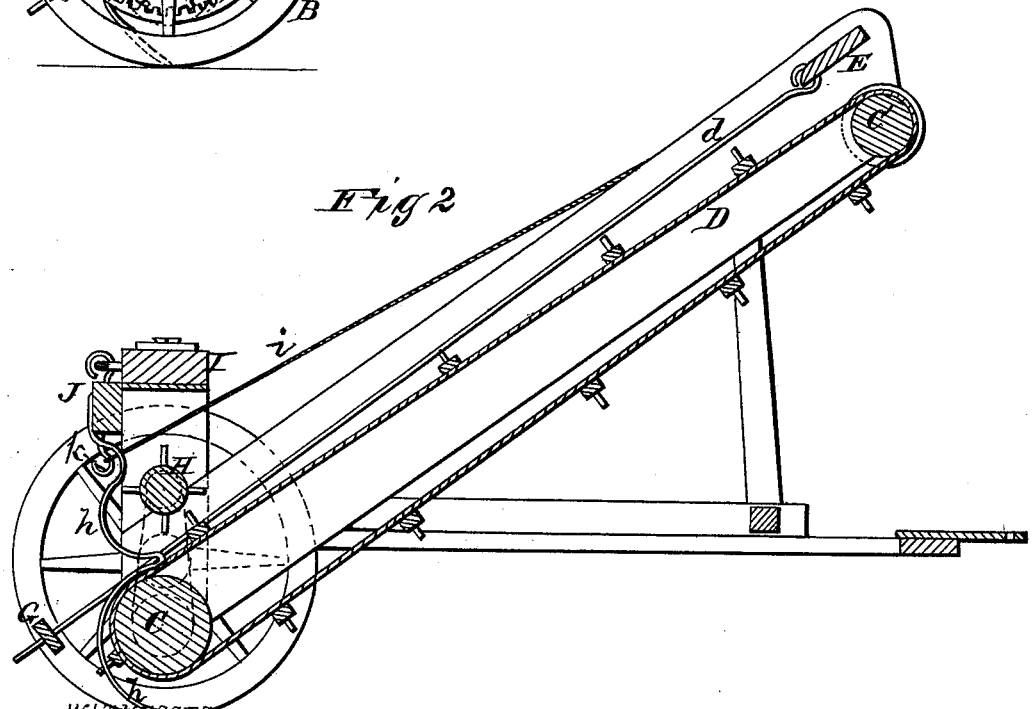

UNITED STATES PATENT OFFICE.

FRANCIS T. WILSON AND EZRA J. BARTLETT, OF AMES, IOWA.

IMPROVEMENT IN HAY-LOADERS.

Specification forming part of Letters Patent No. 175,226, dated March 21, 1876; application filed February 21, 1876.

*To all whom it may concern:*

Be it known that FRANCIS T. WILSON and EZRA J. BARTLETT, of Ames, in the county of Story and State of Iowa, have invented certain new and useful Improvements in Hay Rake and Elevator; and do hereby declare that the following is a full, clear, and exact description thereof, reference being had to the accompanying drawings, and to the letters of reference marked thereon, making a part of this specification.

The nature of our invention consists in the construction and arrangement of a hay rake and loader, as will be hereinafter more fully set forth.

In order to enable others skilled in the art to which our invention appertains to make and use the same, we will now proceed to describe its construction and operation, referring to the annexed drawing, in which—

Figure 1 is a side elevation of our machine. Fig. 2 is a longitudinal section of the same.

A represents the elevator-frame, provided with suitable braces and tongue underneath, to be attached to the hind axle of a wagon, the lower end of the frame A being supported upon driving-wheels B B, placed upon suitable spindles projecting from the frame. To the inner side of one of the driving-wheels B is attached a cog-wheel, $b$, which meshes with and drives a pinion, $a$, upon the journal of the lower roller C of the elevator. The apron D passes around this roller and the upper roller C', and is provided, as is usual, with a series of toothed transverse ribs, $b\ b$.

At the upper end of the frame A, above the roller C', is a cross-bar, E, in which are looped a series of rods, $d\ d$, which extend downward over the apron and have their lower end connected by a cross-bar, G, through which the ends of the rods are passed. Above the lower end of the elevator is a spiked cylinder, H, having its journal-bearings in an upright frame, I, secured to the lower end of the elevator-frame, said roller or cylinder being rotated by a belt and pulleys from the lower roller C of the elevator. From the top bar of the frame I is suspended a bar, J, forming the rake-head, and to which the rake-teeth $h\ h$ are fastened. These teeth are bent in the form shown particularly in Fig. 2, their lower portions being in semicircular form, and from the upper end of such semicircle each tooth forms another smaller semicircle, and is then bent under the head J, and upon the outer or rear side thereof. This peculiar curvature of the teeth renders them sufficiently stiff for all purposes, and at the same time gives them the required amount of spring.

The rods $d$ pass between the teeth, and the teeth are prevented from rising by the cross-bar G, on said rods. By adjusting this cross-bar G on the rods $d$, the distance the rake-teeth $h$ can move is easily regulated.

An arm, $k$, extends from one end of the rake-head J, from which a cord or wire, $i$, extends upward to the wagon, by which means the operator can hold the rake teeth close down to the ground.

Having thus fully described our invention, what we claim as new, and desire to secure by Letters Patent, is—

1. The combination, with the elevator-apron D, of the rods $d$, with cross-bar G, and the rake-teeth $h$, curved as described, and secured to the head J, substantially as and for the purposes herein set forth.

2. The combination of the elevator-apron D, rake J $h$, rods $d$, with cross-bar G, and spiked cylinder H, substantially as and for the purposes herein set forth.

In testimony that we claim the foregoing we have hereunto set our hands this 26th day of January, 1876.

F. T. WILSON.
EZRA J. BARTLETT.

Witnesses:
CYRUS E. TURNER,
WM. McMICHAEL.